United States Patent [19]
Okada et al.

[11] 4,153,544
[45] May 8, 1979

[54] METHOD OF TREATING ORGANIC WASTE WATER

[75] Inventors: Katsuto Okada, Tokyo; Hideo Yamamoto, Machida; Susumu Teraguchi, Tama; Norio Ishibashi, Tokyo, all of Japan

[73] Assignee: Marinaga Engineering Co. Ltd., Tokyo, Japan

[21] Appl. No.: 825,847

[22] Filed: Aug. 18, 1977

[30] Foreign Application Priority Data

Aug. 18, 1976 [JP] Japan .................. 51-98463

[51] Int. Cl.$^2$ .............................................. C02C 1/06
[52] U.S. Cl. ............................ 210/12; 210/DIG. 28
[58] Field of Search .......... 210/7, 12, 14, 15, DIG. 28

[56] References Cited

U.S. PATENT DOCUMENTS

| | | | |
|---|---|---|---|
| 3,764,523 | 10/1973 | Stankewich | 210/7 X |
| 3,864,246 | 2/1975 | Casey et al. | 210/7 |
| 3,915,854 | 10/1975 | Torpey | 210/7 X |
| 3,926,794 | 12/1975 | Vahldieck | 210/12 X |

Primary Examiner—Thomas G. Wyse
Attorney, Agent, or Firm—Browdy and Neimark

[57] ABSTRACT

A method of treating organic waste water in an aeration tank is characterized by the fact that (1) the dissolved oxygen content in the aeration tank is adjusted to be within the range of 1.5–4.5 ppm; (2) the temperature of the waste water is controlled to be within the range of 15°–40° C. and the residence time of the waste water in the aeration tank is set at ten or more days if the ratio of the total carbon content to the nitrogen content of the organic materials contained in the waste water (TOC/N) is not less than 5, and the temperature of the waste water is controlled to be within the range of 20°–40° C. and the residence time of the waste water in the aeration tank is set at ten or more days if the TOC/N is less than 5 and not less than 2.5, and (3) the activated sludge content in the aeration tank is kept constant by controlling the amount of COD to be removed according to the equation:

$$\sigma T = 33.5 \times 1.058^{(T-20)}$$

wherein T is a temperature (°C.) of the waste water to be treated, and $\sigma T$ is COD(Cr) to be removed (Kg)/ATP content in the aeration tank (Kg)/day at T° C.

3 Claims, 1 Drawing Figure

METHOD OF TREATING ORGANIC WASTE WATER

The present invention relates to a method of treating organic waste water containing a large amount of nitrogenous constituents. More particularly, the present invention relates to a method of treating organic waste water containing a large amount of nitrogenous constituents in an aeration tank according to a prolonged aeration process substantially without producting excess sludge by keeping constant the activated sludge content in the aeration tank.

Organic waste water is being treated with activated sludge which incorporates organisms, and many attempts have been made to utilize excess sludge produced in the treatment as a fertilizer and/or feed. But, this utilization is accompanied with difficulties because small-scale plants do not produce excess sludge in a large enough amount for such a use, the cost required for concentrating and drying excess sludge is not negligible, and excess sludge may contain harmful substances. Accordingly, at present, the production of excess sludge is not desired.

Also, the conventional method of removing nitrogenous constituents from organic waste water containing nitrogen includes a biological denitrification process, and the process usually proceeds as follows:

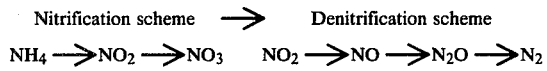

The conventional method of treating organic waste water containing nitrogen comprises three steps for oxidation of organic materials, nitrification and denitrification, and needs the use of three tanks, namely an aeration tank wherein micro-organisms which aerobically oxidize organic materials grow, an aeration tank wherein nitrifying bacteria which aerobically oxidize or nitrify nitrogenous constituents grow, and an aeration tank wherein denitrification bacteria which conduct denitrification grow. Further, the process requires the removal and treatment of excess sludge which is produced in the treatment of organic waste water containing nitrogenous constituents. Thus, the use of complicated apparatus, much expense for operating and managing the apparatus, and high level of operation techniques to control and maintain the activity of micro-organisms in each of the aeration tanks are necessary in carrying out the process.

According to the method of the present invention, it is possible to treat organic waste water containing much nitrogenous constituents through one step and using one tank, and almost no excess sludge is produced, and the COD(Cr) and nitrogen content of the treated water is largely decreased.

The inventors of the present invention have studied the change in sludge content in an aeration tank in case an energy source is added to the sludge continuously to find the maintenance energy of sludge, and have determined the conditions to be maintained in the aeration tank to give a satisfactorily treated water without producing excess sludge by keeping the sludge content constant in the aeration tank.

Hitherto, a method of determining maintenance energy of sludge using single kind of micro-organisms is commonly known [S. T. Pirt, Proc. Royal Soc., Series B 163, 224–231 (1965)]. It is also known that E. coli cell content is kept constant by continuous addition of glucose as an energy source [M. F. Mallet, Journal of Bacteriology, 83, 844–850 (1952)]. But, in this case, the bioactivity of the cells gradually decreased.

Normally, the increase of sludge content in an aeration tank is approximately expressed by the following equation [W. W. Eckenfelder, Biological Treatment of Waste Water, Corona Press, 55–56 (1965)].

$$\Delta S = [a][Lr] - [b][Sa]] \qquad (1)$$

wherein $\Delta S$ is increase of solid material content in the biological sludge, $Lr$ is the removed BOD, $Sa$ is the average solid content of the mixture in the aeration tank, $a$ is the ratio of BOD synthesized to sludge, and is normally 50–70% of the removed $BOD_5$, and $b$ is an automatic oxidation speed of sludge, namely an amount of organic materials automatically oxidized by sludge per day, and is for example about 25–25%/day at 25° C. in case of such waste water as feed-lot waste water containing soluble substances, and about 6–12%/day for waste water containing solid materials of slow oxidation speed such as domestic sewage. According to Sidney, the coefficients a and b in the equation (1) above change depending on the temperature of waste water to be treated [Clark Sidney, PB Report, 195673 (1970)].

In order to determine the treatment condition to be kept in an aeration tank to make zero the $\Delta S$ according to the equation (1) above, the inventors of the present invention made the following experiments to determine the maintenance energy of sludge comprising various micro-organisms and to study the change in sludge content when an energy source is used to continuously add energy to the sludge.

In the experiments, an aerobic condition was kept in an aeration tank by adjusting the dissolved oxygen content within the range of 1.5 ppm to the saturation point. This range of dissolved oxygen content was established for the reason that the critical dissolved oxygen content for aerobic and anaerobic metabolism of micro-organisms which can metabolicly grow both aerobically and anaerobically is about 0.7 ppm [Gary F. Bennet & Lloyd L. Kempe, Oxygen Transfer in Biological System, 20th Ind. Waste Conf. Purdue Univ. Expt. 118, 435–449 (1965)], and considering maintenance of conditions for enough aerobic metabolism and safe operation and control of the tank. Though the possibility of metabolic inhibition of even aerobic bacteria at a high level of dissolved oxygen content is known [Shiro Nagai, Biochemical Technology, Science and Technique Press, 292–293 (1975)], experiments at the saturation point were also made.

EXPERIMENT 1

Various waste waters including waste water containing cheese whey, water from chemical plants and artificial waste water were treated in aeration tanks under aeration. The treatment was continued for one year according to the fill and draw process wherein aeration was stopped once a day and supernatant liquid in the tanks was discharged as the treated water. The treatment temperature was set within the range of 4°–40° C., and the sludge content was 1500 ppm while the treatment temperature was within the range of 4°–25° C., and 500 ppm for the temperature of 30°–40° C. The residence time of waste water in the tanks depends on the kind of waste water, and was five to ten days. Activated sludge from dairy plants, or filtered activated sludge from sewage treatment plants was used as the seed sludge. The ATP content in aeration tanks reached constant values after six months passed from the start of the experiments, and then the treated water, which was obtained for six months after that time, was evaluated. For any source, the treated water had a suspended solid (SS) content of 12-24 ppm, a COD(Cr) of 6-20 ppm and a BOD of 4.5-11 ppm. In general, sludge content and ATP content in sludge indicative of living cell numbers are much influenced by treatment temperature. In the experiments, they were almost constant during the treatment because the treatment temperature was kept constant. Namely, the ratio of removed COD(Cr) (Kg) to ATP content (Kg) in aeration tanks (removed COD/ATP) was 12.0-15.5 at 4° C., 17.5-20.6 at 10° C., 28.8-30.4 at 18° C., 43.1-45.9 at 25° C., 57.6-60.5 at 30° C., 168-174 at 35° C., and 271-290 at 40° C. The ratios of mixed liquor volatile suspended solid (MLVSS) content to mixed liquor suspended solid (MLSS) content in aeration tanks (MLVSS/MLSS) were 0.81-0.85 (cheese whey waste water), 0.86-0.92 (artificial waste water) and 0.65-0.72 (chemical plant waste water). In addition, it was found that ATP(mg)/MLVSS(g) values in aeration tanks change at increased temperatures, and they decreased to about 0.5 at 30°-40° C. while being 1-1.35 at 4°-30° C.

The inventors of the present invention made further experiments to learn the relationship between the coefficient a in the equation (1) above, which indicates a conversion ratio of organic materials in waste water to be treated to micro-organisms, and treatment temperature. Namely, in the treatment of waste water containing cheese whey according to the fill and draw process as the above, the amount of sludge accumulated in aeration tanks was determined at treatment temperatures of 10° C., 20° C., 30° C. and 40° C. by recovering a fixed amount of sludge from tanks every day. The results teach, against the theory previously suggested by Sidney, that the conversion ratio of COD(Cr) to sludge is not a function of treatment temperature and is constantly 0.55 regardless of treatment temperature is the residence time is sufficiently long.

From the results of the above experiments, it was found that removed COD(Cr)(Kg)/ATP(Kg)/day is almost the same at the same treatment temperature regardless of the type of waste water to be treated. Further, it was found that removed COD(Cr)(Kg)/ATP(Kg) at each treatment temperature is the maintenance energy of sludge at the temperature because the organic materials in waste water were converted to sludge at the same ratio at any treatment temperature.

The observed relationship between removed COD(Cr)(Kg)/ATP(Kg) and treatment temperature (°C.) is shown in FIG. 1 (semilogarithmic graph) of the attached drawing. According to the test result obtained by analysis of variance in the case at 4° C. or 30° C., the correlation coefficient between removed COD(Cr)(Kg)/ATP(Kg)/day and treatment temperature was 50% for the three types of waste water treated, and thus was not significant, but the value was 99%, and thus significant for treatment temperature. The test result of correlation coefficient between removed COD(Cr)(Kg)/ATP(Kg)/day at 4°-30° C. had a confidence coefficient of 99%. 4°-22

On the basis of the result shown in FIG. 1, the relationship of treatment temperature (° C.) with removed COD(Cr)(Kg)/ATP(Kg)/day, namely the maintenance energy of sludge ($\sigma T$) at a treatment temperature within the range of 4°-30° C. is expressed by the following equation:

$$\sigma T = 33.5 \times 1.058^{(T-20)} \quad (2)$$

As mentioned above, as the confidence coefficient of the correlation coefficient between removed COD(Cr)(Lg)/ATP(Kg)/day and treatment temperature is 99%, the values within the region marked with oblique lines are effectively employed in treatment of waste water. The values found at a temperature of more than 30° C. to 40° C. for the three types of waste water were higher than those calculated according to the equation (2) above, for example the value was 168-174 at 35° C. ($\sigma 35°$ C.) and 270-290 at 40° C. ($\sigma 40°$ C.). But, of course, the treatment could be carried out even at values calculated according to the equation (2) above. The equation (2) is believed to be applicable to a temperature range of 0°-4° C. because no sudden change in activity of micro-organisms was observed within this range. The maintenance energy of $E.\ coli$ was 1790 by Marr [A. G. Marr, Ammals. of New York Academy of Science 102, 536-548 (1963)] and 1280 by Shulz [Shulz, Arch Mikrobiol, 48, 1-12 (1964)]; the ATP content of 1 g of $E.\ coli$ was assumed to be 1 mg in both cases. Therefore, the maintenance energy of sludge comprising various micro-organisms is extremely low as compared with that of sludge comprising a single kind of micro-organism, so obviously one cannot guess the former energy from the latter one.

From the above result, it is sure that selection of removed COD(Cr) or ATP content per day in an aeration tank determines the other together with treatment temperature according to the equation (2) above if the dissolved oxygen content in the tank is kept within the range of 1.5 ppm to the saturation point. Further, the volume of the aeration tank and sedimentation basin used, and the inflow of waste water to be treated are determined accordingly.

Generally, the optimum growth temperature for nitrifying bacteria which act in the nitrifying step ranges from 28° C. to 30° C., and the treatment temperature must be not less than 15° C. and the dissolved oxygen content, not less than 1.5 ppm. These conditions do not control the speed of the nitrification reaction. The pH suitable for growth of bacteria varies depending on the kind of the bacteria, and for example is preferably 8.6 for Nitrosomonas bacteria which convert $NH_4$ to $NO_2$, and 7.0 to 8.3 for Nitrobacters which convert $NO_2$ to $NO_3$. In addition, relative growth speed is 0.3-1.1/day in Nitrosomonas bacteria at 20°-30° C., and 0.03-1.39/day in Nitrobacters at 6°-23° C. [A. L. Downing, Journal of Institute of Sewage Purification, 139-158 (1964)]. Many of the nitrifying bacteria are autotrophic bacteria, and require carbon dioxide for their growth [Kei Arima, Journal of Fermentation Association, 20, 381 (1962)], and their growth of inhibited in the presence of much organic material.

The micro-organisms which can take part in the denitrification step include, for example, Pseudomonas, $E.\ coli$, Clostridium, Azotobacter, Achromobacter and Micrococci bacteria, and about 50% of aquatic micro-organisms are reported to possess denitrifying activity [Yasunori Tohya, Journal of Sewage System Association, 7, 23 (1970)]. The optimum pH range for growth of the foregoing micro-organisms is 7.0-8.2. Further, it is reported that their denitrifying action is inhibited at a dissolved oxygen content in an aeration tank of 0.2 ppm or more [V. B. D. Skerman, Can. J. Microbiology, 3, 505–515 (1957)].

In short, it is important that the presence of a large amount of organic material should be avoided because the presence of such causes inhibition of growth of nitrifying bacteria resulting in prevention of nitrification, and enough oxygen must be supplied to the bacteria in a biological nitrification step, and anaerobic conditions must be maintained in a denitrification step.

Experiment 2

According to the present invention, it is clear that the number of micro-organism cells in sludge is kept constant at each treatment temperature, and thus satisfactory treatment of waste water is provided without formation of excess sludge if the volume of waste water and/or the volume and/or the number of waste water and aeration tanks is adjusted so that the load per 1 kg of ATP is $33.5 \times 1.058^{(T-20)}COD(Cr)Kg$ at a treatment temperature (T° C.) of 4°–30° C. according to the above equation (2), 168–174 COD(Cr) Kg at 35° C., and 271–290 COD(Cr) Kg at 40° C.

In an embodiment of the process of the present invention which falls within the above conditions, water having a load of 0.1 Kg COD(Cr)/m³/day, and containing 1.25 g of glucose, 0.191 g, 0.381 g or 0.763 g of NH₄Cl, 0.43 g of K₂HPO₄ and 10 ml each of a 2 M solution of $Fe^{2+}$, a 2 M solution of $Mg^{2+}$ and a 2 M solution of $Ca^{2+}$ per 1l, namely water having a TOC (total organic carbon)/N of 2.5, 5 or 10 was used as the raw waste, and sludge from sewage treatment plants which gross insoluble materials were removed by filtration and which was acclimated to temperatures of 10° C., 15° C., 20° C., 25° C., 30° C., 35° C. and 40° C., respectively, for six months was used as the seed sludge. In the treatment, the pH in an aeration tank (volume: 80l) was kept within the range of 6.8–7.8, and the raw waste water was treated at a temperature each of 10, 15, 20, 25, 30, 35 and 40° C., and with the residence time each of 5, 10 and 15 days under the three conditions that the dissolved oxygen content is within the range of 1.5–3.5 ppm, 2.5–4.5 ppm or 4.5 ppm to the saturation point. The results obtained are summarized in the following tables.

| Treatment Temp. (°C.) | TOC/N ≧ 5 Dissolved Oxygen (ppm) | Residence Time (day) | Removed Nitrogen (%) |
|---|---|---|---|
| 10 | 1.5–3.5 | 15 | 45 |
|  | 2.5–4.5 |  | 40 |
| 15 | 1.5–3.5 | 15 | 74 |
|  |  | 10 | 68 |
|  |  | 5 | 42 |
|  | 2.5–4.5 | 15 | 72 |
|  |  | 10 | 66 |
|  |  | 5 | 44 |
|  | ≧ 4.5 | 10 | 60 |
| 20 | 2.5–4.5 | 10 | 82 |
|  |  | 5 | 72 |
| 40 | 2.5–4.5 | 10 | 78 |
|  |  | 5 | 70 |

| Treatment Temp. (°C.) | 5 > TOC/N ≧ 2.5 Dissolved Oxygen (ppm) | Residence Time (day) | Removed Nitrogen (%) |
|---|---|---|---|
| 10 | 1.5–3.5 | 15 | 30 |
|  | 2.5–4.5 |  | 27 |
| 15 | 1.5–3.5 | 15 | 62 |
|  |  | 10 | 53 |
|  |  | 5 | 24 |
|  | 2.5–4.5 | 15 | 63 |
|  |  | 10 | 53 |
|  |  | 5 | 21 |
|  | ≧ 4.5 | 15 | 65 |
|  |  | 10 | 45 |
| 40 | 2.5–4.5 | 15 | 74 |
|  |  | 10 | 63 |
|  |  | 5 | 52 |

The results shown in the tables demonstrate that if the load per 1 Kg of ATP is adjusted according to the equation:

$$\sigma T = 35.5 \times 1.058^{(T-20)} COD(Cr) Kg/ATP\ Kg/day,$$

and the residence time and the dissolved oxygen content are set to be not less than 10 days and 1.5–4.5 ppm, respectively, the removal of nitrogen, from organic waste water containing nitrogen, of not less than 60% is provided at a treatment temperature of 15°–40° C. in case the TOC/N of the raw waste water is not less than 5, and at a treatment temperature of 20°–40° C. in case of the TOC/N being less than 5 and not less than 2.5. The waste waters treated according to the above conditions all had a BOD of 4–18 ppm, a SS of 8–21 ppm and COD(Cr) removal of 90–94%, and thus were satisfactory. The ATP content in the aeration tanks during the measurement period of six months was almost constant.

If desired, a separate denitrification tank is placed to increase the nitrogen removal. The denitrification tank is placed in combination with the aeration tank, and a portion of the mixture in the aeration tank is sent to the denitrification tank in a certain proportion to the raw waste water in the denitrification tank wherein said portion and the raw waste water were stirred and mixed, and then flowed into the aeration tank after a certain period of residence under anaerobic conditions.

In explaining and illustrating the method of the present invention, the amount of organic materials removed by micro-organisms comprising the sludge was expressed in terms of COD(Cr). This is because little reliance can be placed on the measured BOD of raw waste water.

Further, the content of living micro-organism cells comprising the sludge, which is an index of sludge activity, was expressed with ATP content of the cells which was suggested by Weddle [C. L. Weddle, Water Research, 5, 621–640 (1973)]. This expression is advantageous in tht the ATP content of micro-organism cells is almost constant regardless of the kind of micro-organism, and its growth speed in each of the growth stages, and extraction of ATP from cell, and measurement of ATP in cells is quickly conducted, and the recovery of the ATP approximate 100%.

As is apparent in the foregoing, MLSS and MLVSS values, which are conventional indexes of activity of sludge, were not employed in the description about the process of the present invention. The reason is that the values indicate only solid content of sludge, and cannot indicate the activity of sludge precisely.

Sludge activity expressing values include oxygen absorptive capacity or dehydrogenase content. But, the measured values of them change depending on the temperature at the time of measurement even if the same sludge is used. Accordingly, it is difficult to find bioactive micro-organism content of sludge from those measurements. Further, of the methods of counting living bacteria, it is difficult to obtain the precise living cell content from the conventional plate culture process and microscopic examination process. This is because micro-organisms which form sludge comprise low-, medium-, and high-temperature bacteria, and thus only those bacteria which grow at the treatment temperature used can act, the micro-organisms form flocs, and further the growth of autotrophic bacteria contained in sludge is inhibited in the presence of organic materials.

The process of the present invention was explained in detail above, and is further illustrated with the following examples concretely. In the examples, ATP content was measured by using a biophotometer manufactured by JRB Company in U.S.A. All the measurements in the examples were obtained according to the JIS-K-0102 method.

EXAMPLE 1

Waste water from a food plant which manufactures ice cream, chocolate and candies was treated in the following manner. The properties of the waste water are summarized in Table 1.

Table 1

| Properties of Waste Water | | |
|---|---|---|
| BOD$_5$ | 70 - 650 | ppm |
| SS | 10 - 55 | " |
| COD(Cr) | 100 - 1140 | " |
| Nitrogen | 1.4 - 19.5 | " |
| Phosphorus | 0.01 - 0.07 | " |
| pH | 5.8 - 11.0 | " |
| Flow amount/day | 750 m$^3$ | |

The COD(Cr) of the raw waste water was 413 Kg per day. The treatment temperature was kept within the range of 9°–18° C., and thus the removed COD(Cr)(Kg)/ATP content in the aeration tank (Kg)/day at 12° C. is 21.3 according to the equation (2) above: $\sigma T = 33.5 \times 1.0584^{(T-20)}$. Thus, the ATP content in the aeration tanks was calculated to be 413/21.3 = 19.39 Kg. In order to adjust the ATP content in the aeration tanks to about 4.85 ppm, there were placed two aeration tanks [each of 2000 m$^3$; 5 (depth) × 20 × 20m], and each of the tanks was equipped with a surface aerator having an oxygen supplying capacity of 12.5 Kg O$_2$/hour.

A microstrainer was placed at the inlet of the first tank for the raw waste water to remove insoluble solids.

In the treatment, sludge from a dairy plant was first put in the aeration tanks as the seed sludge, and then the operation of the tanks was carried out. At the end of the treatment, the aerator attached to the second tank was stopped for an hour to settle the sludge, and then the supernatant liquor was gradually discharged over an hour.

After the discharge was completed, the aeration was carried out again. The above procedure was automatically carried out twice, namely in the morning and in the evening, per day.

During the first six months of operation the treated waste water was not analyzed. Thereafter, over a period of five months, it was analyzed each time the waste water was discharged. The COD(Cr) content of the raw waste water was 605 Kg/day at the maximum, and 72 Kg/day at the minimum.

The properties of the treated water were good as shown in Table 2 below. The ATP content in the aeration tanks was 18–24.5 Kg, the MLSS was 5100–6000 ppm, and the dissolved oxygen content during the operation was within the range of 1.6–6.8 ppm.

Table 2

| Properties of Treated Water | | |
|---|---|---|
| pH | 6.8 - 7.8 | |
| BOD$_5$ | 4 - 18 | ppm |
| COD(Cr) | 11 - 27 | " |
| SS | 6 - 24 | " |

EXAMPLE 2

Waste water from a chemical plant was treated in the following manner. The properties of the raw waste water was as shown in Table 3 below.

Table 3

| Properties of Raw Waste Water | | |
|---|---|---|
| pH | 8 - 9 | |
| COD(Cr) | 1425 - 2037 | ppm |
| BOD$_5$ | 950 - 1200 | " |
| SS | 0 - 12 | " |
| Nitrogen(according to Kjeldahl's method) | 7.2 - 11.8 | " |
| Phosphorous | 1.8 - 2.5 | " |

The COD(Cr)/day was 630 Kg at the maximum, and 150 Kg at the minimum and the average was 400 Kg. The amount of waste water was 320 m$^3$ at the maximum, and 100 m$^3$ at the minimum, and the average was 250 m$^3$.

The treatment temperature was kept within the range of 22°–26° C. The maintenance energy of micro-organisms comprising sludge at the average treatment temperature of 24° C. is 42.04 Kg according to the equation (2) above: $\sigma 24 = 33.5 \times 1.0584^{(T-20)}$. In order to control the ATP content in the aeration tank to 3.5 ppm, the volume of the aeration tank was adjusted to be 1500 m$^3$[5(water depth) × 14 × 14m], and an aerator with oxygen supplying capacity of 22.5 Kg O$_2$/hour was attached to the tank. The supernatant liquid was continuously discharged into a sedimentation basin (60 m$^3$). The operation was carried out using sludge from a sewage treatment plant as the seed sludge, and the treated water obtained after six months passed from the beginning of the operation was analyzed. The results obtained by ten months of analysis are shown in Table 4 below.

Table 4

| Properties of Treated Water | | |
|---|---|---|
| pH | 7.2-7.8 | |
| COD(Cr) | 65-114 | ppm |
| BOD$_5$ | 9-28 | " |
| SS | 6-33 | " |

The average COD(Cr) removal for the ten months was 95%, and 380 Kg/day. The ATP content in the aeration tank could be maintained within the range of 38–41.5 Kg. The dissolved oxygen content during the operation was 1.8–6.5 ppm.

EXAMPLE 3

Waste water from degumming of silk was treated in the following manner. The properties of the waste water are shown in Table 5.

Table 5

| Properties of Waste Water | | | | |
|---|---|---|---|---|
| pH | 6.8–9.0 | | (average) | |
| $BOD_5$ | 350–2500 | ppm | 1500 | ppm |
| CO (Cr) | 520–3450 | " | 2600 | " |
| SS | 50–120 | " | 75 | " |
| TN | 90–350 | " | 210 | " |
| TP | 1–2 | " | 1.8 | " |
| TOC/N | | | 3.6 | " |
| Flow amount/day | 150–420 | $m^3$ | 360 | $m^3$ |

Possible COD(Cr) removal (%) at 21° C. was investigated using sludge acclimated to the above waste water, and with a shaking cultivator, and it was estimated that 94% of the COD of the waste water would be removable.

According to the equation: $\sigma T = 33.5 \times 1.058^{(T-20)}$, 33.4564 Kg of COD(Cr) can be treated at 21° C. per Kg of ATP per day. So, the COD(Cr) Kg/$m^3$/day was controlled to be 1 g to adjust the ATP content of sludge to 0.0282 g, and the COD of the supernatant liquid was determined after twenty-four hours of treatment by shaking cultivation. The removed COD(Cr)/day was 879.84 Kg. The ATP content of micro-organisms in sludge whose maintenance energy is 879.84 Kg is 24.815 Kg. As the TOC/N of the raw waste water is 3.6, the residence time at 21° C. is not less than 10 days in order to insure the nitrogen removal of 60% or more.

On the basis of the foregoing, there were placed two aeration tanks (each having the size of 5 (water depth)$\times 20 \times 20 \times m$) having a total volume of 4000 $m^3$. The residence time was about 11 days, and the ATP content in the aeration tanks was adjusted to be 6.2 ppm. A surface aerator having oxygen supplying capacity of 22.5 Kg $O_2$/hour was attached to each of the tanks. The surface aerator attached to the second aeration tank was stopped once a day for 2.5 hours; during the first hour the sludge settled and over the next 1.5 hours supernatant liquid was discharged.

A denitrification tank (800 $m^3$; 5(water depth)$\times 12.65 \times 12.65 m$) was placed in front of the first aeration tank, and a portion of the mixture in the second aeration tank was sent to the denitrification tank in an amount equal to 60% of that of the raw waste water contained in the denitrification tank to be mixed with said raw waste water to accelerate the denitrification. At the beginning of the operation, sludge from a sewage treatment plant was added to the waste water to be treated as the seed sludge. Following the first six months of operation the treated water was analyzed for a period of three months, and the data shown in Table 6 below was obtained.

Table 6

| | Properties of Treated Water | |
|---|---|---|
| | Separate denitrification tank was used | No separate denitrification tank was used |
| pH | 6.6–7.6 | 6.7–7.8 |
| $BOD_5$ (ppm) | 9 | 7 |
| COD(Cr) (ppm) | 46 | 44 |
| SS (ppm) | 14 | 12 |
| $No_1$-N (ppm) | 2.9 | 1.2 |
| $No_2$-N (ppm) | 0.1 | 0.1 |
| $NO_3$-N (ppm) | 55.3 | 18.8 |
| Nitrogen Removal | 70% | 90% |

As is shown in Table 2, the properties of the treated water were satisfactory, and the nitrogen removal (70% in case no separate denitrification tank was used, and 90% in case the separate denitrification tank was used) was good. The ATP content in the aeration tanks was within the range of 18.2–23 Kg, and was stable. The dissolved oxygen content in the aeration tanks ranged 1.8–4.5 ppm.

Figure 1:
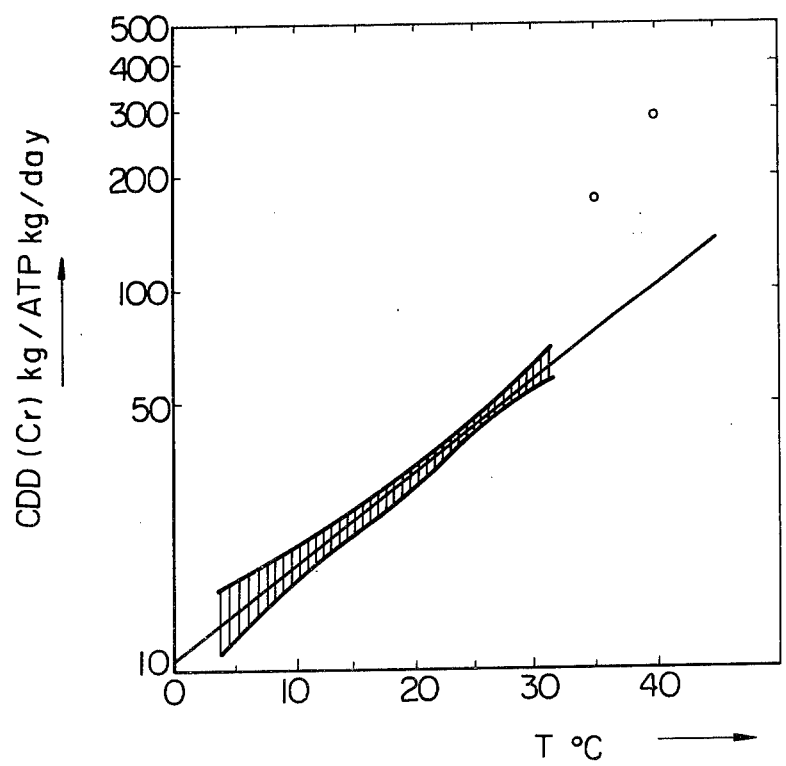
FIG. 1 shows the relationship between removed COD(Cr) Kg/ATP Kg/day and treatment temperature (T° C.) in the treatment of waste water according to the process of the present invention.

What we claim is:

1. In a method of treating organic waste water containing large amounts of nitrogenous substituents by prolonged aeration in an aeration tank in which oxidation, nitrification and denitrification occur in the same aeration tank, the improvement wherein:

almost no excess sludge is produced and the COD (Cr) and nitrogen content of the treated waste water is largely decreased. by:
(1) adjusting the dissolved oxygen content in the aeration tank to be within the range of 1.5–4.5 ppm;
(2) controlling the temperature of the waste water to be within the range of 15°–40° C. and maintaining the residence time of the waste water in the aeration tank at ten or more days; and
(3) keeping constant the activated sludge content in the aeration tank by controlling the amount of COD(Cr) to be removed according to the equation:

$$\sigma T = 33.5 \times 1.058^{(T-20)}$$

wherein T is a temperature (°C.) of the waste water to be treated, and $\sigma T$ is COD(Cr) to be removed (Kg)/ATP content in the aeration tank (Kg)/day at T° C.

2. A method in accordance with claim 1, wherein the temperature of the waste water is maintained at 15°–40° C. when the ratio of the total carbon content to the nitrogen content of the organic materials in the waste water (TOC/N) is not less than 5.

3. A method in accordance with claim 1, wherein the temperature of the waste water is maintained at 20°–40° C. when the ratio of the total carbon content to the nitrogen content of the organic materials contained in the waste water (TOC/N) is 2.5 up to 5.

* * * * *